United States Patent

[11] 3,621,397

[72] Inventors Masayoshi Murotani
Kanagawa;
Ryoichi Tanaka, Tokyo; Keiji Tachikawa, Chiba; Tadao Shimamura, Tokyo, all of Japan
[21] Appl. No. 843,583
[22] Filed July 22, 1969
[45] Patented Nov. 16, 1971
[73] Assignees Nippon Telegraph & Telephone Public Corporation
Tokyo, ;
Nippon Electric Company, Limited
Tokyo, Japan
[32] Priority July 22, 1968
[33] Japan
[31] 43/52062

[54] PCM TRANSMISSION SYSTEM
14 Claims, 27 Drawing Figs.

[52] U.S. Cl. .......... 325/38, 179/15.55, 178/66
[51] Int. Cl. .......... H03k 13/22, H04b 1/66
[50] Field of Search .......... 179/15 BV, 15 BW, 15 AP, 15.55; 178/DIG. 3, 66, 67, 68; 325/38, 38 B

[56] References Cited
UNITED STATES PATENTS

| | | | |
|---|---|---|---|
| 2,722,660 | 11/1955 | Jones, Jr. | 179/15 BV |
| 3,097,338 | 7/1963 | Pinet et al. | 325/38 |
| 3,393,364 | 7/1968 | Fine | 325/38 B |
| 3,502,806 | 3/1970 | Townsend | 178/DIG. 3 |
| 3,330,909 | 7/1967 | Willson | 178/66 X |
| 3,398,239 | 8/1968 | Rabow | 178/66 |
| 3,505,470 | 4/1970 | Gorog | 178/66 |

*Primary Examiner*—Benedict V. Safourek
*Attorney*—Marn and Jangarathis

ABSTRACT: A transmission system for a television signal represented by a pulse code modulation signal compressed in bandwidth, comprising a transmitter for dividing the television signal into a preselected number of samples indicated by a corresponding number of first sets of parallel pulse code modulation pulses which are converted into a preselected number of second sets of parallel pulse code modulation pulses containing "O" and "1" logic signals to indicate slow and rapid changes in the television signal magnitude at successive even-number signal samples; the preselected second number being smaller than the preselected first number; the second parallel pulse sets being transmitted as series pulse code modulation pulses; and a receiver for converting the received series pulses into a third set of parallel pulse code modulation pulses including the "0" and "1" logic signals and corresponding to the transmitter second pulse sets, and translating the receiver third pulse sets into a reproduction of the transmitter television signal.

INVENTORS
Masayoshi Murotani
Ryoichi Tanaka
Keiji Tachikawa
Tadao Shimamura
BY
Marn & Jangarathis
ATTORNEYS INVENTORS
Masayoshi Murotani
Ryoichi Tanaka
Keiji Tachikawa
Tadao Shimamura
BY
Marn & Jangarathis
ATTORNEYS INVENTORS
Masayoshi Murotani
Ryoichi Tanaka
Keiji Tachikawa
Tadao Shimamura
BY
Marn & Jangarathis
ATTORNEYS INVENTORS
Masayoshi Murotani
Ryoichi Tanaka
Keiji Tachikawa
Tadao Shimamura
BY
Marn & Jangarathis
ATTORNEYS

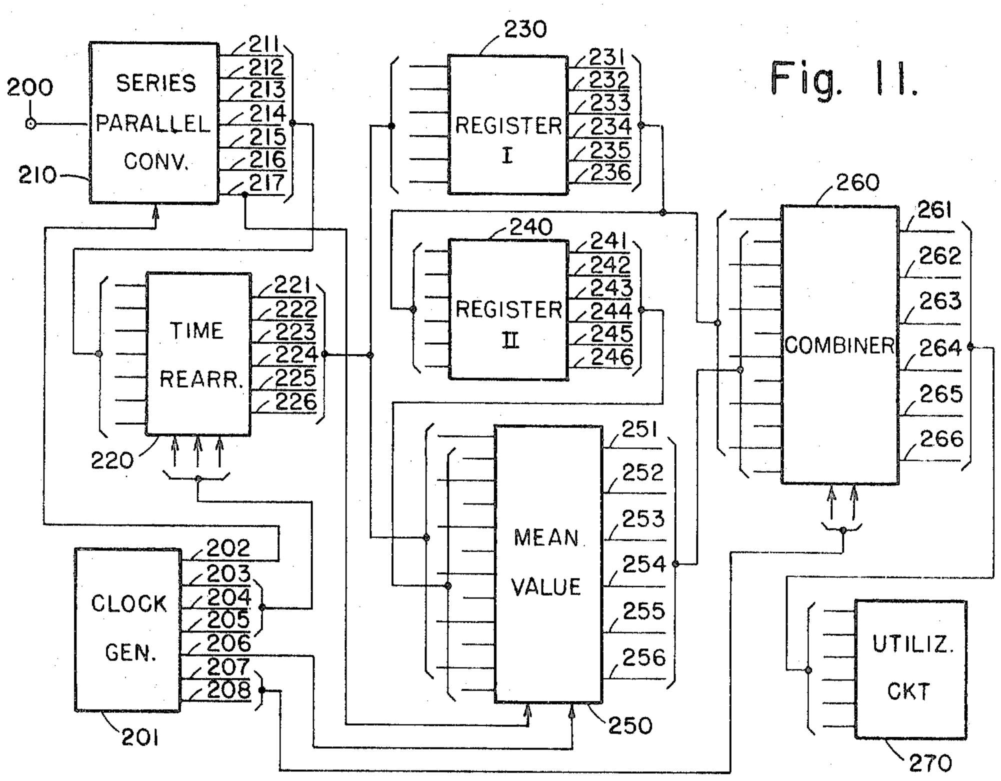
Fig. 11.
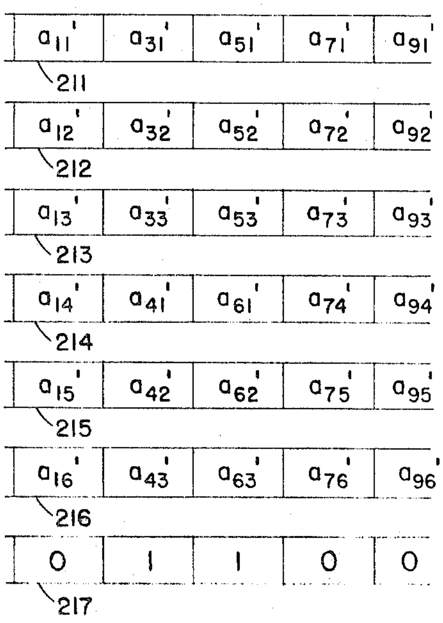
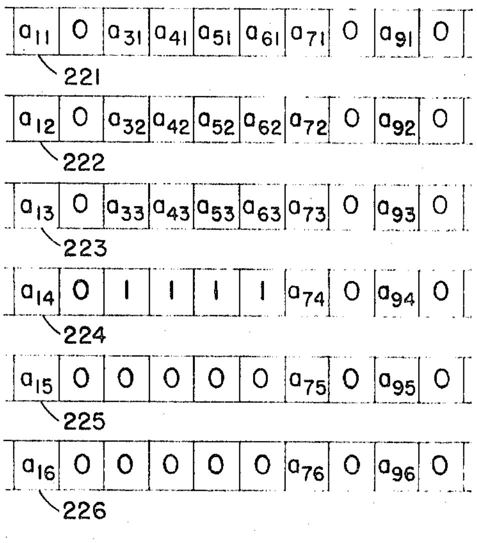
Fig. 13.
Fig. 12.
INVENTORS
Masayoshi Murotani
Ryoichi Tanaka
Keiji Tachikawa
Tadao Shimamura
BY Marn & Jangarathis
ATTORNEYS INVENTORS
Masayoshi Murotani
Ryoichi Tanaka
Keiji Tachikawa
Tadao Shimamura
BY
Marn & Jangarathis
ATTORNEYS INVENTORS
Masayoshi Murotani
Ryoichi Tanaka
Keiji Tachikawa
Tadao Shimamura
BY
Marn & Jangarathis
ATTORNEYS INVENTORS
Masayoshi Murotani
Ryoichi Tanaka
Keiji Tachikawa
Tadao Shimamura
BY
Marn & Jangarathis
ATTORNEYS

PCM TRANSMISSION SYSTEM

BACKGROUND OF THE INVENTION

This invention relates to a system for transmitting a PCM signal with band compression and, more particularly, to a system of the kind applicable to the transmission of television picture signals.

In general, a television picture signal has great redundancy. On the other hand, it is known that PCM transmission is highly insusceptible to noise but requires a considerably wider frequency band than other types of transmission.

An approach to compressing of the bandwidth of a television signal or other approximately repetitive signals is to utilize, according to information theory, the fact that the conditional entropy of the signal is smaller than the primary entropy. More particularly, the amount of the information to be actually transmitted is reduced by using the correlation which is positive for the signal portions spaced by the period of the approximate repetition, such as for the signal portions representing the respective picture elements of the consecutive scanning lines and also of the consecutive frames (Peter Elias, "Predictive Coding," IRE Transaction on Information Theory, Mar. 1955, pp. 16–33; Robert E. Draham, "Predictive Quantizing of Television Signals," IRE Wescon Convention Record, Aug. 1958, pp. 147–156). The system according to this theory however, requires a highly complicated memory device.

Another approach is to resort to visual psychophysics. This does not fall in the category of band compression in the strict sense as regards the reproducibility of the information contained in the original signal but provides band compression when the information receptor (the human visual nerves in the case of the television signal) is deemed as a part of the information transmission system. The band compression of this sort is based on the fact that the discriminating ability of the human eyes depends on the rate or speed of variation of the luminance levels. More particularly, slow change in the luminance level of successive picture enables the human eyes to discriminate minute difference in the luminance level, whereas the discriminating ability decreases when the luminance level varies quickly. The band compression is also based on the fact that the human visual sense responds to the contour of an object or pattern as a whole and to the luminosity of the internal areas.

An example of this kind of approach is the "Synthetic Highs" system proposed by W. F. Schreiber ("Synthetic Highs—An Experimental TV Bandwidth Reduction System," Journal of the SMPTE, Volume 68, Aug. 1959, pp. 525–537), which comprises a filter for dividing the picture signal into a lower and a higher frequency component, means for transmitting the lower component as an analogue signal without any modification, and means for transmitting the higher component after having encoded the same with comparatively rough quantization. The higher component results from the border lines of the patterns contained in a picture. The number of such border lines is very small in general. In other words, the amount of the information concerning these border lines is small as compared with the amount of the information regarding the whole picture. It is therefore possible, by coarsely quantizing such information and transmitting the encoded information together with the information concerning the positions of such border lines, to transmit the higher frequency component at a reduced speed as compared with the speed required to transmit the whole picture signal as it occurs.

In another example, the lower frequency component is subjected to fine quantization while the higher frequency component is subjected to coarse quantization (E. R. Kretzner, "Reduced-Alphabet Representative of Television Signals," IRE Convention Records, Part III, 1956, pp. 140–147). In this system, the sampling frequency is high and the number of bits in a codeword is small for the higher component, while the sampling frequency and the number of bits in a code word are low and large, respectively, for the lower component. Transmission of the whole picture signal is thus carried out at nearly constant speed, which is equal to the speed of the fine-quantization transmission of the lower component.

These systems based on the psychophysics are much easier to manufacture than the systems relying on information theory. These systems, however, are still complicated in that they require two separate encoders for the lower and the higher components and two channels for transmitting these components.

SUMMARY OF THE INVENTION

It is therefore a general object of this invention to provide a simplified system for transmitting a PCM signal with band compression.

It is a specific object to provide a PCM signal with band compression specifically applicable to the transmission of a television signal.

The system of this invention as applied to the transmission of a television picture signal is based on visual psychophysics. Study of psychophysics has revealed that there is an upper limit in the amount of the information acceptable by the human visual sense during a unit time, with the result that the amount of the luminance information decreases with the increase in the amount of the spatial or geometrical information and vice versa. It follows therefore that the transmission of the entire information extending beyond the upper limit is wasteful and that the information should be transmitted at a speed below the speed corresponding to the upper limit.

According to a generalized aspect of this invention, there is provided:

In a PCM transmission system for data variable with time, and represented by PCM codewords of a first kind, respectively, said first-kind codewords appearing at a rate of $p$ per unit time where $p$ is a given positive number, a transmitter comprising:

means responsive to $q$ consecutive ones of said data where $q$ is an integer greater than two, for sensing the speed of variation of such consecutive data to produce a variation-representing signal element, having the form of at least one digit of PCM codewords of a second kind, said second-kind codewords appearing at a rate of $p/r$ per said unit time where $r$ is an integer greater than one, said signal element representing at least two discrete values which correspond to the respective degrees of said speed, and means responsive to said first-kind codewords and said signal elements for producing the second-kind codewords, each said second-kind codeword standing for $r$ consecutive first-kind codewords, said second-kind codewords containing at first prescribed bit positions said signal elements, respectively, each said second-kind codeword further containing at a second bit position the codes of the more significant digits of a preselected one of said $r$ first-kind codewords, each said second-kind codeword still further containing at the remaining bit position the codes of the remaining digits of said preselected first-kind codeword whenever the signal element contained therein shows slow variation of the data and the codes of the more significant digits of the predetermined at least one of said $r$ consecutive first-kind codewords except said preselected one whenever the signal element contained therein shows quicker variation.

The data as called herein may be represented by either a digital signal or by samples derived from an analogue signal. In the latter case, $p$ is the samples per unit time. The variation-representing signal-producing means may be supplied at a time time with the analogue signal portion covering either $r$ consecutive samples or $r$ first-kind PCM codewords. It is now assumed that $r$ is 4, that the speed is divided into 3°, that two codewords are predetermined from four consecutive codewords for medium speed, and that four codewords are predetermined similarly for high speed. The preselected first-kind codeword may be the first, the second, the third, or the fourth of the four codewords. Depending on which of the four codewords is preselected, the predetermined two codewords may be either of a set of the first and the third codewords or of a set of the second and the fourth codewords. It is understood that seven combinations of codewords are possible in which one, two and four correspond to the slow, the medium and the high speeds, respectively. Under the circumstances, it is necessary to provide seven discrete values for the signal elements.

For example, an analogue signal is sampled at a sampling frequency of 10 MHz and encoded into eight-bit PCM codewords. The variation-representing signal element is produced with reference to four consecutive samples to represent whether the variation is rapid, moderate, or slow. When the variation is rapid, the more significant two digits of each codeword are transmitted so that two bits are transmitted per datum sampled at 10 MHz. repetition frequency. When the variation is moderate, the more significant four digits of every other codeword are transmitted so that four bits are transmitted per datum sampled at 5 MHz. When the variation is slow, the full digits are transmitted for only one preselected codeword in each set of four consecutive codewords so that eight bits are transmitted per datum sampled at 2.5 MHz. The variation-representing signal element has three bits to represent the seven combinations when the binary code is used for the PCM signal. Under the circumstances, the original PCM signal which would have been transmitted at a speed of 80 megabits per second is transmitted as a modified PCM signal which equivalently contains 11-bit codewords for the data sampled at 2.5 MHz. and is transmitted at a speed of 27.5 megabits per second. THe ratio of compression is about one-third.

In another example, the variation-representing signal element has one bit representing the slow and the rapid variations. When the variation is rapid, four bits are transmitted at a repetition frequency of 10 MHz. When the variation is slow, full eight digits are transmitted at a second repetition frequency of 5 MHz. The transmission speed for the modified PCM signal is thus $(8+1)\times5=45$ megabits per second. This provides compression of about one-half.

According to this invention, transmission of the whole PCM signal is carried out at a substantially constant speed with only one encoder and without a memory device which has been indispensable in the output circuit to attain the nearly equal speed. This invention thus provides a much simplified system of the kind.

BRIEF DESCRIPTION OF THE DRAWINGS

FIG. 11 is a block diagram of a receiver of the system of this invention;

FIG. 12 shows a portion of the received band-compressed PCM signal;

FIGS. 13 through 15 show portions of various signals in the receiver;

DESCRIPTION OF THE PREFERRED EMBODIMENTS

Figure 3:
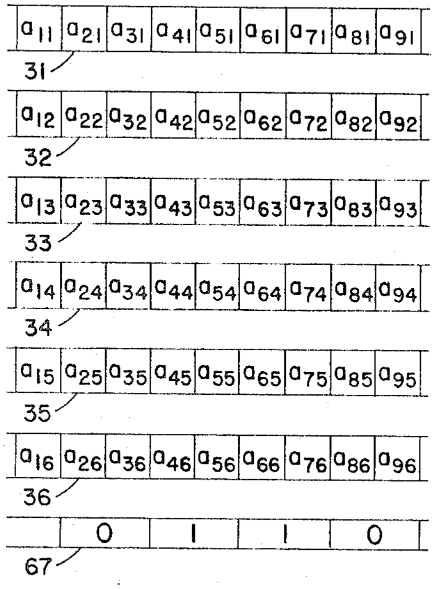
FIG. 3 shows a portion of the original PCM signal.
Figure 4:
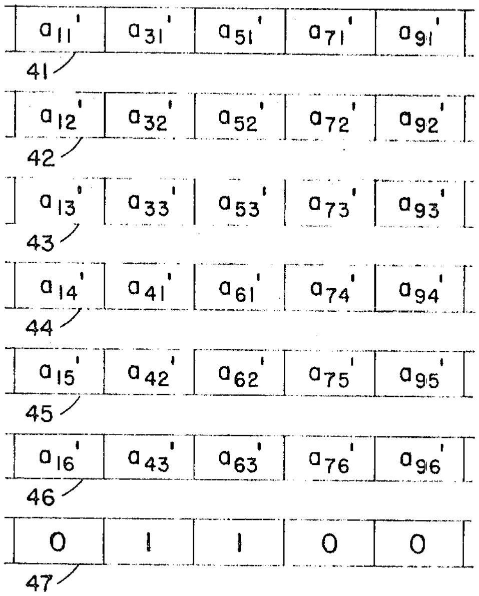
FIG. 4 shows a portion of the band-compressed PCM signal.

Referring to FIGS. 1 through 4 inclusive, it is presumed that each sample $S_i$ ($i$ is an integer) shown in FIG. 2A of an analogue signal 30 is encoded in a transmitter of this invention into six-bit parallel PCM binary pulses 31–36 shown in FIG. 3, that the original PCM pulses 31–36 are band-compressed into seven-bit parallel PCM output pulses 41–47 shown in FIG. 4, which may be subsequently converted into a series PCM output signal 49, and that the PCM output pulses 41–47 or signal 49 is band-compressed, in effect, from six bits per sample into 3.5 bits per sample.

The transmitter comprises a signal source 51 of the analogue signal 30 and a clock generator 52 generating sampling pulses 54 of a sampling period $t$, timing pulses 55 of a repetition period $2t$, and first clock pulses 56 having a repetition period of $t$ and a common pulse width of $t/2$. The clock generator 52 further generates second, third, and fourth clock pulse trains 57, 58, and 59 having a common repetition period of $2t$ and a common pulse width of $t/2$, these clock pulse trains 57, 58, and 59 being shifted in time from the first clock pulse train 56 by the respective amounts mentioned hereunder.

The transmitter further comprises a sampler-encoder 61 for encoding each sample $S_i$ derived therein by the sampling pulses 54 from the analogue signal 30 supplied thereto, into a set of six parallel PCM pulses 31–36 in the known manner. Thus, the samples $S_1$, $S_2$, ..., $S_i$, ... are represented by the successive sets of PCM pulses ($a_{11}$, $a_{12}$, ..., $a_{16}$), ($a_{21}$, $a_{22}$, ..., $a_{26}$), ..., ($a_{i1}$, $a_{i2}$, ..., $a_{i6}$), ... shown in FIG. 3, each bit $a_{ij}$ ($j$ is an integer) being either logic "1" or "0" in case the pCM signal is of the binary form, the first bit $a_{i1}$ in each set being assumed to represent the most significant digit of a set of the PCM pulses 31–36 for the $i$th sample $S_i$.

The transmitter still further comprises a source 62 of a threshold signal $h$ (FIG. 2B) and a variation discriminator 63 including, as will be described later in detail, a difference deriver 64 with linear, parabolic, or other interpolation supplied with the analogue signal 30, a comparator 65 supplied with the output $x$ of the deriver 64, the threshold signal $h$, and the timing pulses 55, and a delay circuit 66 for delaying the output of the comparator 65 to provide logic "1" and "0" variation-representing pulses 67 (FIG. 3). By virtue of the timing pulses 55, the difference deriver 64 with linear interpolation, for example, develops in effect the samples $S_i$, produces with reference to the odd-numbered samples $S_{2i-1}$ and $S_{2i+1}$ for reference, even-numbered calculated samples $S_{2i}'$ (FIG. 2A) and derives, in principle, that difference signal $e$ (FIG. 2B) representing the difference between the true and the calculated even-numbered samples $S_{2i}$ and $S_{2i}'$ which represents the rate or speed of variation of the analogue signal 30 or the derived PCM pulses 31–36 at the portion of the sampling point $T_{2i}$ for the even-numbered sample $S_{2i}$. The comparator 65 produces logic "1" and "0" pulses of a common pulse width of twice as long as the sampling period $t$ when the difference signal $e$ is greater and smaller than the threshold signal $h$, respectively, in absolute value. The delay circuit 66 gives delay to the "1" and "0" pulses so that each of the variation-representing pulses 67 may be in time registered with those two consecutive PCM pulse sets of the PCM pulses 31–36, the speed of variation at which portion is represented by the particular variation-representing pulse 67. For example, the variation-representing pulses 67 vary from "0" to "1," as shown in FIG. 3, in time coincidence with the leading edges of the PCM pulses $a_{41}$, $a_{42}$, ..., and $a_{46}$ for the fourth sample $S_4$ at which portion the analogue signal 30 varies rapidly and returns to "0" simultaneously with the trailing edges of the PCM pulses $a_{71}$, $a_{72}$, ..., and $a_{76}$ for the seventh sample $S_7$ preceding the following sample $S_8$ at which portion the speed of variation is slow.

The transmitter further comprises a band compressor 68 for deriving, in the manner mentioned below in detail, seven-bit band-compressed PCM output pulses 41–47 from the original PCM pulses 31–36 and the variation-representing pulses 67 by using the first through the fourth clock pulses 56–59. As shown in FIG. 4, the successive sets of the PCM output pulses 41–47 consist of ($a_{11}'$, $a_{12}'$, ..., $a_{16}$, "0"), ($a_{31}'$, $a_{32}'$, $a_{33}'$, $a_{41}'$, $a_{42}'$, $a_{43}'$, "1"), ... . The first bit $a_{(2i-1)1}$ in each set represents the most significant digit of the PCM output pulses 41–46 for the odd-numbered sample $S_{2i+1}$, while the seventh bit represents the speed of variation. It will be seen that the more significant three digits $a_{(2i+1)1}$, $a_{(2i+1)2}$, and $a_{(2i+1)3}$ of the original PCM pulses 31–36 for the reference samples $S_{2i+1}$ are always used as the corresponding digits of the PCM output pulses 41–47 with the pulse width doubled and with the leading edges delayed by a sampling period $t$ relative to the variation-representing pulses 67 or the seventh-bit pulses. When the seventh bits are "0" and "1", the less significant three digits $a_{(2i+1)4}$, $a_{(2i+1)5}$, and $a_{(2i+1)6}$ of the original PCM pulses 31–36 for the reference sample $S_{2i+1}$ with the leading edges delayed by the sampling period $t$ and more significant three digits $a_{(2i+2)1}$, $a_{(2i+2)2}$, and $a_{(2i+2)3}$ of the original PCM pulses 31–36 for the even-numbered true sample $S_{2i+2}$ without the delay are used, respectively, as the less significant three digits of the PCM output pulses 41–47, with the pulse width being doubled. In this manner, the band compressor 68 compresses the original PCM pulses 31–36 containing six bits of information per sample into the PCM output pulses 41–47 containing 7/2 bits per sample.

The transmitter may further comprise a parallel-series converter 69 for converting the band-compressed PCM output pulses 41–47 into a series PCM output signal 49.

Figures 1, 2A, 2B:
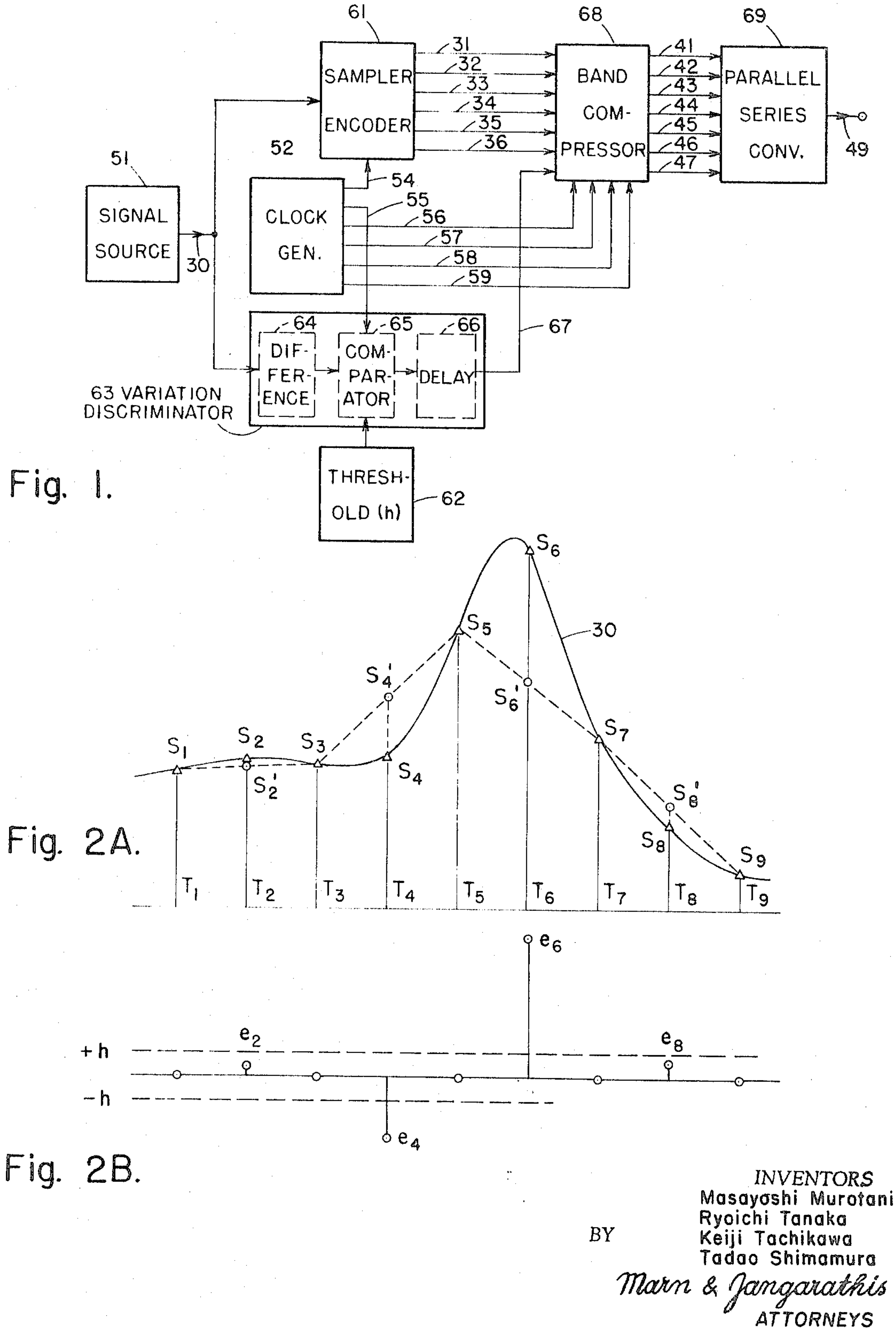
FIG. 1 is a block diagram of a transmitter of the system of this invention.
FIGS. 2A and 2B show signals for explaining the operation of a variation discriminator in the transmitter.
Figure 5:
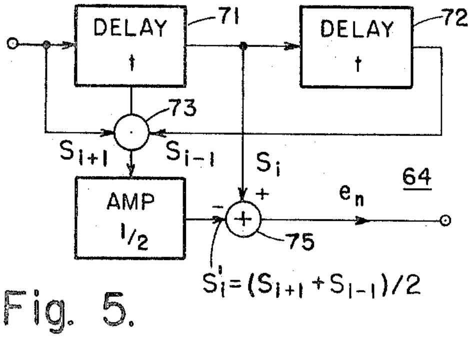
FIG. 5 is a block diagram of a difference deriver.
Figure 6:
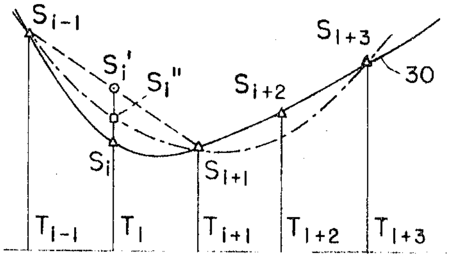
FIG. 6 shows a portion of the analogue signal for explaining the operation of the variation discriminator.

Referring further to FIG. 2a and also to FIGS. 5 and 6, the difference deriver 64 with linear interpolation comprises first and a second ideal delay lines 71 and 72, respectively, each having a delay time of the sampling period $t$. At the moment the third sample $S_{i+1}$ of a set of three samples $S_{i-1}$, $S_i$, and $S_{i+1}$ reaches the input of the first delay line 71, the second and the first samples $S_i$ and $S_{i-1}$ reach the outputs of the first and the second delay lines 71 and 72, respectively. The deriver 64 further comprises an adder 73 for deriving the sum of the samples $S_{i-1}$ and $S_{i+1}$ and an amplifier 74 with a gain of one-half for dividing the sum by two to provide the calculated sample $S_i'$. The deriver 64 still further comprises a subtractor 75 for subtracting the calculated sample $S_i'$ from the corresponding true sample $S_i$ to give the difference signal $e_i$ given by the following equation:

$$e_i=S_i-S_i'=S_i-(S_{i-1}+S_{i+1})/2.$$

Figure 7:
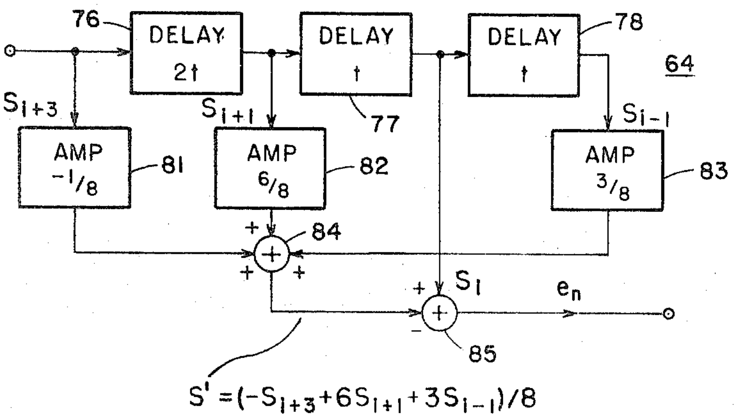
FIG. 7 is a block diagram of another difference deriver.

Referring further to FIG. 6 and also to FIG. 7, a difference deriver 64 with parabolic interpolation comprises a first delay line 76 having a time delay of $2t$ and a second and a third delay lines 77 and 78, respectively, each providing a time delay of $t$. At the moment the sample $S_{i+3}$ reaches the input of the first delay line 76, the samples $S_{i+1}$, $S_i$, and $S_{i-1}$ reach the outputs of the first, the second, and the third delay lines 76, 77, and 78, respectively. The deriver 64 further comprises first, second, and third amplifiers 81, 82, and 83 having the gains of minus one-eighth (a combination of an inverter and an attenuator), six-eighths, and three-eighths, respectively, for the input of the first delay line 76 and the outputs of the second and the third delay lines 77 and 78, respectively. The deriver 64 still further comprises an adder 84 for deriving the sum of the amplifier outputs to provide the calculated sample $S_i'$ and a subtractor 85 for subtracting the sum from the true sample $S_i$ to deliver the difference signal $e_i$ given in this case by the following relation:

$$e_i=S_i-S_i'=S_i-(-S_{i+3}+6S_{i+1}+3S_{i-1})/8.$$

Figure 8:
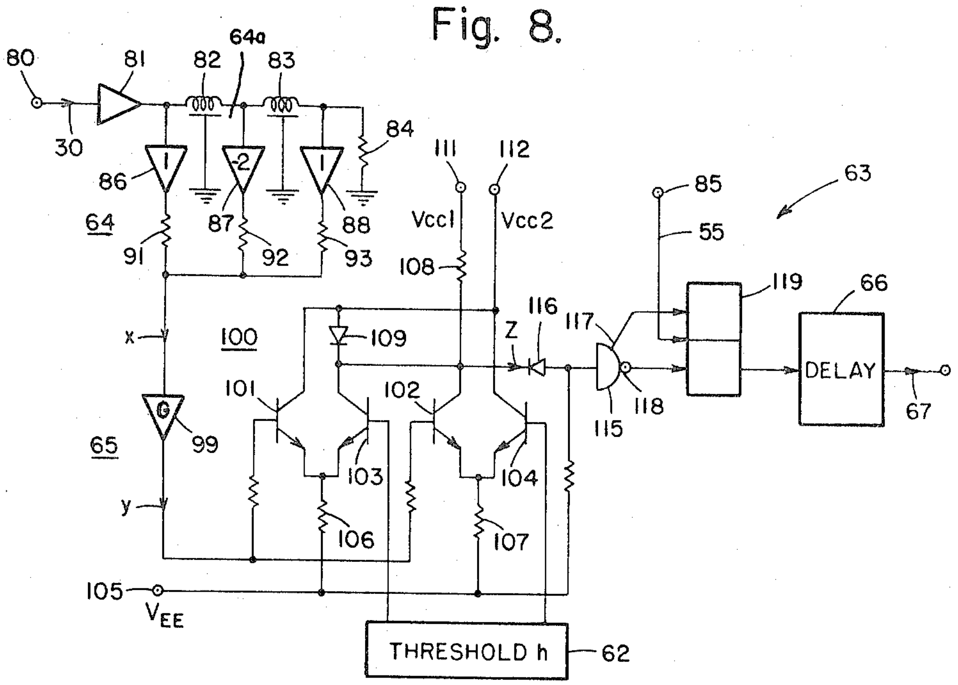
FIG. 8 is a circuit diagram of the variation discriminator.

Referring to FIG. 8, the difference deriver 64 with linear interpolation comprises an analogue signal input terminal 80 of the variation discriminator 63, buffer amplifier 81 of unit gain for the analogue signal 30, and a delay circuit 64a including first and second delay lines, 82 and 83, respectively. Each of the delay lines 82 and 83 has a delay time of the sampling period $t$ and may be either a lumped-constant delay network or a distributed-constant delay line (for example, a coaxial cable). The delay circuit 64a is terminated by a resistor 84 whose resistance is equal to the characteristic impedance of the delay lines 82 and 83. By virtue of the timing pulses 55 supplied to a timing pulse input terminal 85 of the discriminator 63, signals appearing at the tap points of the delay circuit correspond to the samples $S_{2i+1}$, $S_{2i}$, and $S_{2i-1}$, respectively, provided that the delay lines are ideal and have no insertion loss. These signals are applied to first, second, and third buffer amplifiers 86, 87, and 88, respectively. Each of the first and the third amplifiers 86 and 88 has a unit voltage gain, while the second amplifier 87 has minus Twice the unit voltage gain. The outputs of the respective amplifiers 86, 87, and 88 are led to a resistor adder consisting of three resistors 91, 92, and 93, each of which has the same resistance. The output signal $x$ of the adder is two-thirds of the difference signal $e_i$ because of the following equality:

$$x=(S_{2i-1}+S_{2i+1}-2S_{2i})/3$$
$$=(2/3)\cdot[(S_{2i-1}+S_{2i+1})/2-S_{2i}]=2e_i/3.$$

With an actual delay line which exhibits insertion loss, it is necessary to change either the gains of the buffer amplifiers 86, 87, and 88 or the resistances of the resistors 91, 92, and 93 or both so as to compensate for the insertion loss of the delay lines 82 and 83.

The comparator 65 comprises a voltage amplifier 99 of a gain G selected in the manner mentioned below for amplifying the difference deriver output signal $x$ to produce an amplified output $y$ and a comparator unit 100 having first and second input transistors 101 and 102, respectively, and first and second paired transistor 103 and 104, respectively. The amplified output $y$ is supplied to the bases of the first and the second input transistors 101 and 102. The emitters of the first input and paired transistors 101 and 103 are connected with a biassing source 105 of the biassing voltage $V_{EE}$(a negative voltage) via a first biassing resistor 106. The emitters of the second input and paired transistors 102 and 104 are also connected with the biassing source 105 via a second biassing resistor 107. Similarly, the collectors of the second input and the first paired transistors 102 and 103 are connected, via a load resistor 108 and a diode 109, with first and second power supplies 111 and 112, respectively, of the first and the second power voltages $V_{CC1}$ and $V_{CC2}$, respectively. Furthermore, the collectors of the first input and the second paired transistors 101 and 104 are connected with the second power supply 112. The relation between the first and the second power voltages $V_{CC1}$ and $V_{CC2}$ is given by the following inequalities:

$$V_{CC1}>V_{CC2}$$

and $$V_{CC2}-V_{109}>V_{CC1}-V_{108},$$

where $V_{108}$ and $V_{109}$ are the voltage drop across the resistor 108 and the forward drop of the diode 109, respectively. The bases of the paired transistors 103 and 104 are supplied with reference voltages $-h$ and $+h$, respectively, by the threshold signal source 62. Each of the transistor pairs 101 and 103 or 102 and 104 forms a differential amplifier.

If $y<-h$, the paired transistors 103 and 104 are conductive. If $-h<y<+h$, the first input and the second paired transistors 101 and 104 and the first paired and the second input transistors 103 and 102 are conductive and nonconductive, respectively so that no current flows through the load resistor 108. In this case, the discrimination output $z$ of the comparator unit 100 is equal to the first power voltage $V_{CC1}$. If $+h<y$, the input transistors 101 and 102 are conductive. It follows therefore that in case the amplified output $y$ is either lower than $-h$ or higher than $+h$, current flows through the load resistor 108. Under the circumstances, the discrimination output $z$ is clamped to the voltage $V_{CC2}-V_{109}$. Thus, the comparator unit 100 discriminates whether the amplified output $y$ is greater or smaller than the reference voltage or the threshold signal $h$ in absolute value.

In practice, the comparator unit 100 may not correctly discriminate the amplified output $y$ when it is nearly equal to the threshold signal $h$ in absolute value. This is due to the imbalance in each differential amplifier. Let it be assumed that voltages $-a$ and $+a$ supplied to the respective bases of the first and the second input transistors 101 and 102 balance the differential amplifiers. Furthermore, let it be recalled that the threshold signal $h$ is selected for the difference signal $e$. Inasmuch as the difference deriver output signal $x$ is equal to $2e/3$, either the gain G of the voltage amplifier 99 should be equal to $3a/(2h)$ or the reference voltage should be two-thirds of the threshold signal $h$ with the gain G being set at the unit.

The comparator 65 further comprises a logic circuit assembly in turn comprising an AND/NAND gate 115 to which the discrimination output $z$ of the comparator unit 100 is supplied, after the level thereof is adjusted by a slicer 116 to a level suitable for the AND/NAND gate 115. The AND/NAND gate 115 produces the input signal as it stands at an AND output terminal 117 and an inverted signal at a NAND output terminal 118. When the discrimination output $z$ is $V_{CC1}$, the outputs at the AND and the NAND output terminals 117 and 118 are logic "1" and "0," respectively. When it is equal to $V_{CC2}-V_{09}$, such outputs are "0" and "1," respectively. These binary codes are delivered to a flip-flop 119, which supplies the NAND output to the delay circuit 66 in accordance with the timing pulses 55. It should be mentioned here that the sampler-encoder 61 produces the bit-parallel PCM pulses 31–36 with a certain time delay relative to the supplied analogue signal 30. The delay circuit 66 is used to make the leading edges of the variation-representing pulses 67 coincide with the leading edges of the PCM pulses 31–36 of every other sample.

Figure 9:
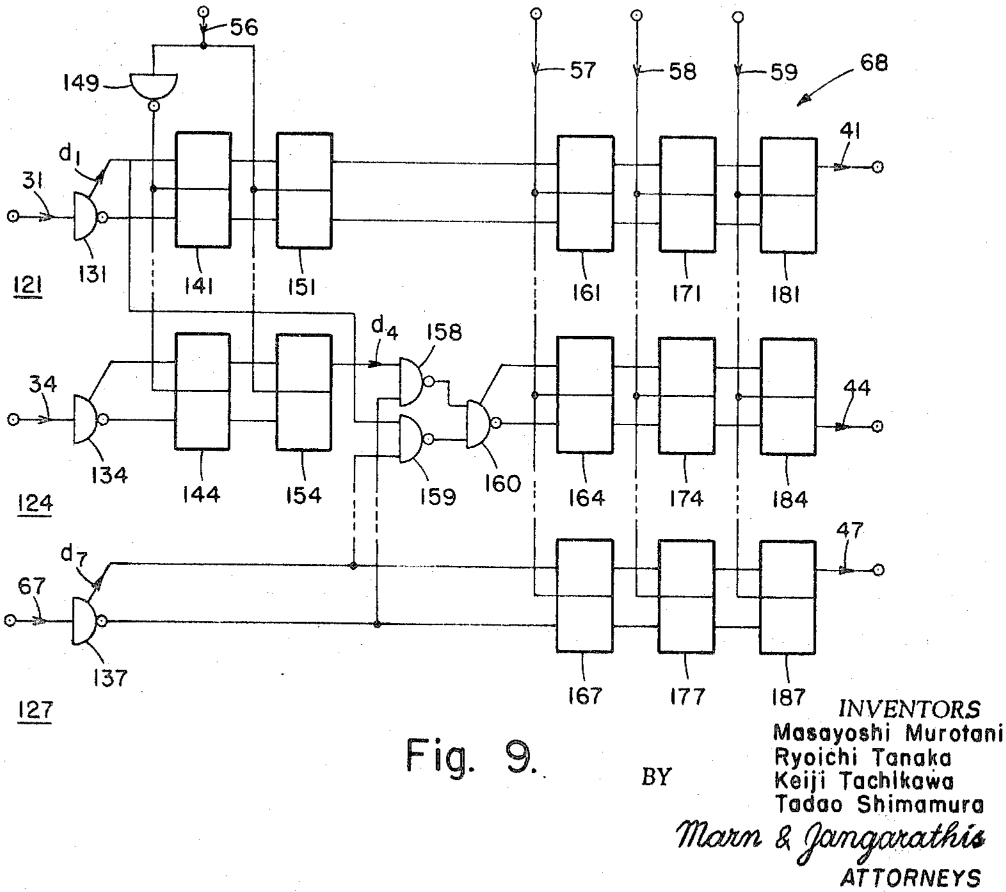
FIG. 9 is a circuit diagram of a band compressor in the transmitter.
Figure 10:
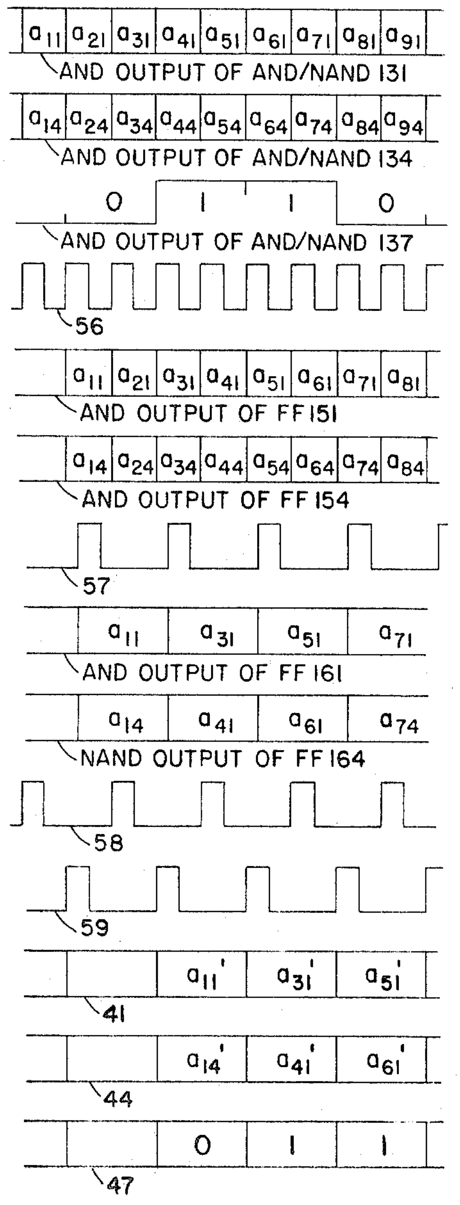
FIG. 10 shows portions of various signals for explaining the operation of the band compressor.

Referring to FIGS. 9 and 10, the band compressor 68 comprises first, ..., fourth, ..., and seventh channels 121, ..., 124, ..., and 127, respectively. The first channel 121 is coupled with the fourth channel 124. Likewise, the second and the third channels (not shown), similar in construction to the first channel 121, are coupled with the fifth and the sixth channels (not shown), similar to the fourth channel 124, respectively. The seventh channel 127 is coupled directly with the fourth, the fifth, and the sixth channels 124, ... . All channels 121, ..., 124, ..., and 127 comprise input AND/NAND gates 131, ..., 134, ..., and 137 supplied with the PCM original pulses 31–36 and the variation-representing pulses 67, respectively. When supplied with "0" and "1" pulses, the AND/NAND gate produces "0" and "1" pulses at the NAND output terminal, respectively. THe first through the sixth channels 121, ..., 124, ... comprise a first set of six flip-flops 141, ..., 144, ... supplied with the AND and the NAND outputs of the first-channel through the sixth-channel AND/NAND gates 131, ..., 134, ... (AND outputs of the first-channel and the fourth-channel AND/NAND gates 131 and 134 are shown in FIG. 10), respectively, and with the first clock pulses 56 (shown in FIG. 10) via an inverter 149. THese six channels 121, ..., 124, ... further comprise a second set of flip-flops 151, ..., 154, ... which receive both AND and NAND outputs of the first-set flip-flops 141, ..., 144, ..., respectively and the first clock pulses 56 as they stand. The AND outputs (those of the second-set first-channel and fourth-channel flip-flops 151 and 154 are shown in FIG. 10) are six-bit parallel PCM pulses delayed by a sampling period $t$ relative to the corresponding outputs of the input AND/NAND gates 131, ..., 134, ..., The fourth channel 124 comprises first and second NAND gates 158 and 159 respectively, supplied with the AND outputs of the first-channel input AND/NAND gate 131 and of the fourth-channel second-set flip-flop 154 together with the AND and the NAND outputs of the seventh-channel input AND/NAND gate 137, respectively. The fourth channel 124 further comprises an intermediate AND/NAND gate 160 supplied with the outputs of the NAND gates 158 and 159. The fifth and the sixth channels comprise similar gates (not shown). When the variation-representing pulses 67 are "1," the gates 158–160 produce at the NAND output of the intermediate AND/NAND gate 160 the AND output of the first-channel input AND/NAND gate 131 with a time delay inherent to the gates 158–160. While the same are "0," the gates 158–160 produce at the NAND output terminal the AND output of the fourth-channel input AND/NAND gate 134 with a time delay equal to the sum of the sampling period $t$ and the delay inherent to the gates 158–160. In general, the operation of the gates 158–160 is represented by a logic relation:

$$a_{NAND}'=\overline{\overline{d_1 \wedge d_7} \wedge \overline{d_4 \wedge \overline{d_7}}}=(d_1 \wedge d_7) \vee (d_4 \wedge \overline{d_7}),$$

where $a_{NAND}'$ is the output of the intermediate AND/NAND gate 160 and $d_j$ represents the AND outputs of the first-channel through the third-channel input AND/NAND gates 131, ..., the fourth-channel through the sixth-channel second-set flip-flops 154, ..., and the seventh-channel input AND/NAND gate 137. All channels 121, ..., 124, ..., and 127 further comprise a third set of flip-flops 161, ..., 164, ..., and 167 supplied with the outputs of the first-channel through the third-channel second-set flip-flops 151, ..., the fourth-channel through the sixth-channel intermediate AND/NAND gates 160, .., and the seventh-channel input AND/NAND gate 137, respectively, and with the second clock pulses 57. The AND outputs of these flip-flops 161, ... of the first through the third channels 121, ..., the NAND outputs of these flip-flops 164, ... of the fourth through the sixth channels 124, ..., and the AND output of the flip-flop 167 of the seventh channel 127 are, as exemplified by the outputs of the first-channel and the fourth-channel flip-flops 161 and 164 in FIG. 10, band-compressed pulses whose leading edges are substantially coincident with the leading edges of the second clock pulses 57. All channels 121, ..., 124, ..., and 127 still further comprise a fourth and a fifth set of flip-flops 171, ..., 174, ..., and 177 and 181, ..., 184, ..., and 187 supplied, as depicted, with both AND and NAND outputs of the corresponding flip-flops of the preceding stages and with the third and the fourth clock pulses 58 and 59. The AND outputs of the fifth-set flip-flops 181, ... of the first through the third channels 121, ..., the NAND outputs of such flip-flops 184, ... of the fourth through the sixth channels 124, ..., and the AND output of the flip-flop 187 of the seventh channel 127 are the desired band-compressed PCM output pulses 41–47, some of which are reproduced in FIG. 10. The flip-flops of the fourth and the fifth sets are provided with a view to putting the PCM output pulses 41–47 in best order.

It should be mentioned here that a low-pass filter (not shown) may be interposed between the signal source 51 on the one hand and the sampler-encoder 61 and the variation discriminator 63 on the other hand. Also, an already-sampled analogue signal may be supplied to an encoder and a variation discriminator (corresponding to the sampler-encoder 61 and the variation discriminator 63, respectively). Alternatively, a variation discriminator, similar to the variation discriminator 63, may produce the variation-representing pulses 67 from the original PCM pulses 31–36.

Referring to FIGS 11 through 15 inclusive, a receiver of this invention to be coupled with the transmitter illustrated in FIG. 1 comprises an input terminal 200 for the band-compressed series PCM pulses, a clock generator 201 for producing a synchronism with the bits and frames of the received series PCM pulses, timing pulses 202 having the repetition period of twice the sampling period $2t$, first clock pulses 203 having a repetition period $2t$ and a common pulse width $t$, and second and third clock pulses 204 and 205 having a common repetition period $t$. The clock generator 201 further produces fourth clock pulses 206, identical in waveform to the first clock pulses 203 but shifted therefrom by an amount which will become clear later. The clock generator 201 still further produces fifth and sixth clock pulses 207 and 208 having a repetition period $t$.

The receiver further comprises a series-parallel converter 210 for converting with reference to the timing pulses 202 the series PCM pulses into reproductions 211–217 (FIG. 12) of the band-compressed parallel PCM output pulses 41–47 of the transmitter, and a time rearrange circuit 220 for rearranging the band-compressed PCM pulses 211–217 into time rearranged PCM pulses 221–226 (FIG. 13) with reference to the first through the third clock pulses 203–205. In case the seventh-bit pulses 217 of the band-compressed PCM pulses 211–217 are logic "0," the rearrange circuit 220 produces as the time-rearranged PCM pulses 221–226 the PCM pulses $a_{(2i+1)1}$, $a_{(2i+1)2}$, ..., and $a_{(2i+1)6}$ for a first period corresponding to the earlier half of each repetition period of the first clock pulses 203 and logic "O" pulses for a second period corresponding to the latter half. In case the seventh bits are "1," the rearrange circuit 220 produces as the more significant three digits of the time-rearranged PCM pulses 221–223 the PCM pulses $a_{(2i+1)1}$, $a_{(2i+1)2}$, and $a_{(2i+1)3}$ for the first period and the PCM pulses $a_{(2i+2)1}$, $a_{(2i+2)2}$, and $a_{(2i+2)3}$, for the second period. In this case, the rearrange circuit 220 further produces logic "1" pulses as the fourth-bit time rearranged PCM pulses 224 and logic "0" pulses as the fifth-bit and the sixth-bit pulses 225 and 226.

The receiver still further comprises first register 230 for giving a delay of one bit time to the time rearranged PCM pulses 221–226 to produce first delayed time rearranged PCM pulses 231–236 and a second register 240 similarly producing second delayed time rearranged PCM pulses 241–246 further delayed by one bit time. The registers 230 and 240 may be composed of flip-flops.

Figure 14:
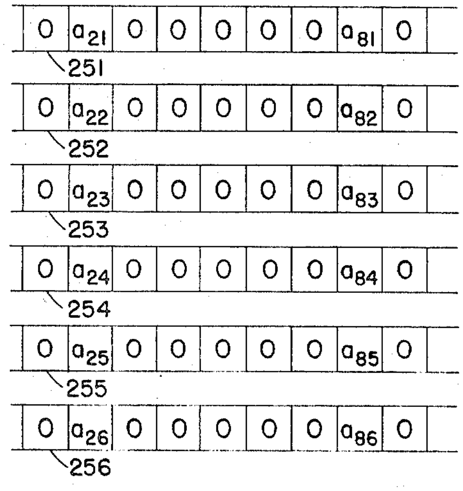
Figure 15:
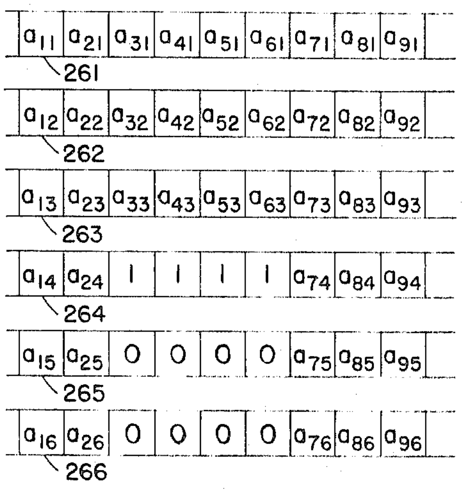

The receiver further comprises a mean value deriver 250 for digitally adding the time-rearranged and the second delayed PCM pulses 221–226 and 241–246 and for dividing the digital sum by two (by shifting, when the PCM pulses are of the binary code, the digit of the sum by one bit towards the most significant digit) to produce mean PCM pulses 251–256 (FIG. 14). It should be noted here that linear interpolation is carried out in the transmitter, that the variation-representing seventh-bit pulses 217 of the band-compressed PCM pulses 211–217 and the fourth clock pulses 206 are supplied to the mean value driver 250 to adjust the timing of the produced mean PCM pulses 251–256 relative to the first delayed PCM pulses 231–236 and to suppress the mean PCM pulses $a_{(2i)1}$, $a_{(2i)2}$, $a_{(2i)3}$, "1," "0," and "0" and the like which are present in the time-rearranged PCM pulses 221–226 when the variation of the original data is rapid, and that "1," "0," and "0" are selected for the less-significant three digits of the time-rearranged PCM pulses 221–226 when the seventh-bit pulses 217 are "1" because $a_{(2i)1}$, $a_{(2i)2}$, $a_{(2i)3}$, "1," "0," and "0" represent the mean value of $a_{(2i)1}$, $a_{(2i)2}$, $a_{(2i)3}$, "1", "1", and "1" and $a_{(2i)1}$, $a_{(2i)2}$, $a_{(2i)3}$, "0," "0," and "0" and consequently minimize on the average the error introduced by omission of the three less significant digits of the original PCM pulses.

The receiver further comprises a signal combiner 260 for superposing the mean PCM pulses 251–256 on the first delayed PCM pulses 231–236 in pertinent time relation provided by the fifth and the sixth clock pulses 207 and 208 to produce approximately reproduced PCM pulses 261–266 (FIG. 15), and a utilization circuit 270 for utilizing the reproduced PCM pulses 261–266.

Figure 17:
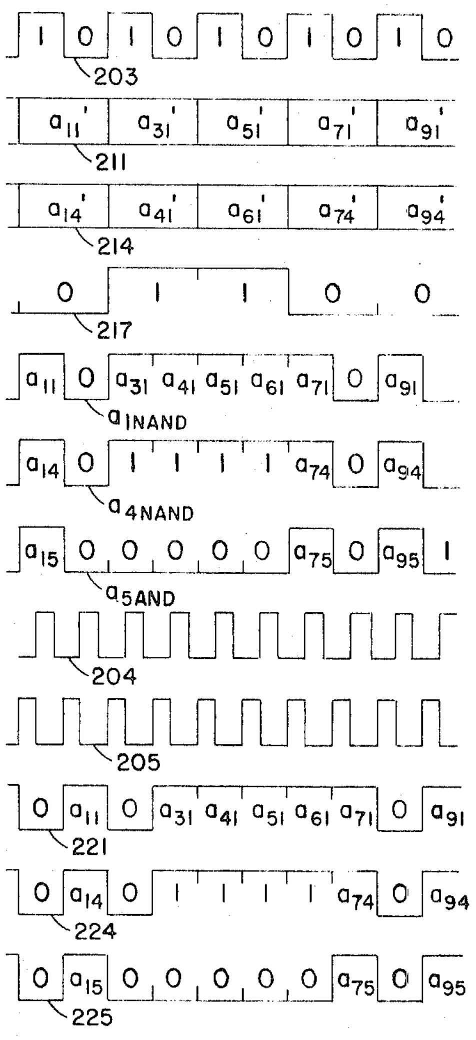
FIG. 17 shows portions of various signals for explaining the operation of the time-rearranging circuit.
Figure 16:
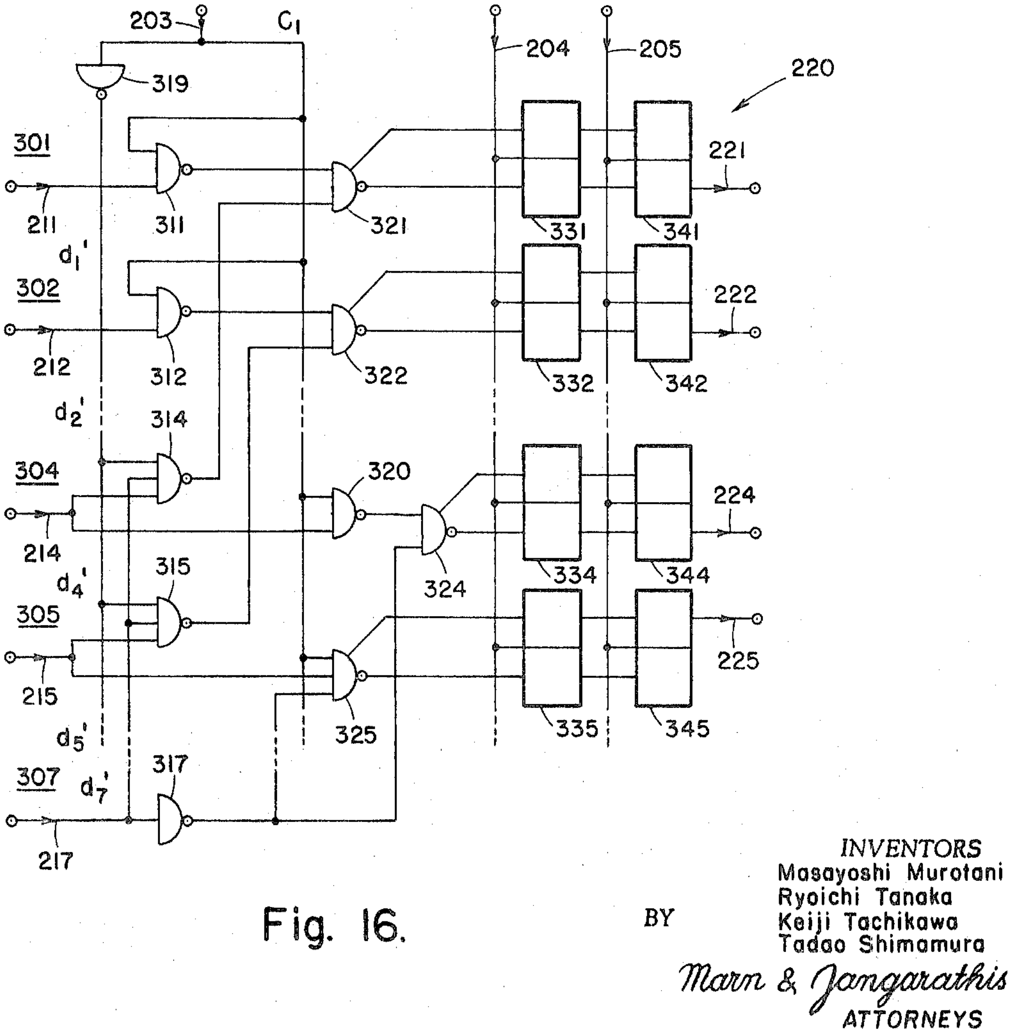
FIG. 16 is a circuit diagram of a time rearranging circuit in the receiver.

Referring now to FIGS. 16 and 17, the rearrange circuit 220 comprises a first through a seventh channels 301, 302, ..., and 307 of which the third and the sixth channels are not depicted. The fourth through the sixth channels 304, 305, ... are coupled with the first through the third channels 301, 302, ..., respectively, while the seventh channel 307 is coupled directly with the fourth through the sixth channels 304, 305, .... The first through the third channels 301, 302, ... are similar in construction. Likewise, the sixth channel is substantially same as the fifth channel 305. All channels 301, 302, ..., and 307 comprise input NAND gates 311, 312, ..., and 317 supplied with the band-compressed PCM pulses 211–217, respectively (the first, the fourth, and the seventh bits are reproduced in FIG. 17). Each of the first-channel through the third-channel NAND gates 311, 312, ... also receives the first clock pulses 203 (FIG. 17), while each of the fourth-channel through the sixth-channel NAND gates 314, 315, ... receives the first clock pulses 203 through an inverter 319 and the seventh-channel PCM pulses 217. The seventh-channel NAND gate 317 receives the seventh-channel PCM pulses 217. The fourth channel 304 comprises an intermediate NAND gate 320 supplied with the fourth-channel PCM pulses 214 and the first clock pulses 203. The first through the sixth channels 301, 302, ... comprise AND/NAND gates 321, 322, ..., respectively. The first-channel AND/NAND gate 321 is supplied with the outputs of the input NAND gates 311 and 314 of the channel 301 and the coupled fourth channel 304. The fourth-channel AND/NAND gate 324 receives the output of the intermediate NAND gate 320 and the output of the seventh-channel NAND gate 317. The fifth-channel AND/NAND gate 325 receives the band-compressed PCM pulses 215 supplied to the channel, 305 the output of the seventh-channel NAND gate 317, and the first clock pulses 203. The NAND output $a_{1NAND}$ (FIG. 17) of the first-channel AND/NAND gate 321 is given by the following logic relation:

$$\underline{a}_{1NAND}=\overline{\overline{\underline{d}_4'\Lambda\underline{d}_7'\Lambda\overline{C_1}}\Lambda\overline{\underline{d}_1'\Lambda C_1}}$$
$$=(\underline{d}_4'\Lambda\underline{d}_7'\Lambda\overline{C_1})V(\underline{d}_1'\Lambda C_1)$$

where $C_1$ and $d_j$ represent the first clock pulses 203 and the band-compressed PCM pulses 211-217, respectively. This relation shows that $2_{1NAND}$ is $a_{(2i\cdot 7E\cdot 1)1}'$ at the earlier half of each repetition period of the first clock pulses 203 and that, at the later half, $a_{1NAND}$ is $a_{(2i)1}'$ and "0" when $a_{(2i\cdot 7E\cdot 1)7}'$ is "1" and "0," respectively. Likewise, the NAND output $a_{4NAND}$ (FIG. 17) of the fourth-channel AND/NAND gate 324 is given by the following logic relation:

$$\underline{a}_{4NAND}=\overline{\overline{\underline{d}_4'\Lambda C_1}\Lambda\overline{\underline{d}_7'}}=(\underline{d}_4'\Lambda C_1)V\underline{d}_7'$$

from which it is apparent that $a_{4NAND}$ is $a_{(2i\cdot 7E\cdot 1)4}'$ and "0" at the earlier half and the later half of each repetition period of the first clock pulses 203, respectively, when $a_{(2i\cdot 7E\cdot 1)7}'$ is "0" and that $a_{4NAND}$ is "1" while $a_{(2i\cdot 7E\cdot 1)7}'$ is "1." Similarly, the AND output $a_{5AND}$ (FIG. 17) of the fifth-channel AND/NAND gate 325 is given by the following logic relation:

$$\underline{a}_{5AND}=\underline{d}_5'\Lambda C_1\Lambda\overline{\underline{d}_7'}$$

which means that $a_{5AND}$ assumes the values of $a_{(2i\cdot 7E\cdot 1)5}'$ and "0" at the earlier half and the later half of the repetition period of the first clock pulses 203, respectively, when $a_{(2i\cdot 7E\cdot 1)7}'$ is "0" and that $a_{5AND}$ assumes "0" when $a(2i_{\cdot 7E}\cdot 1)7'$ is "1". The first through the sixth channels 301, 302, ... further comprise flip-flops 331, 332, ... of a first set supplied with the AND and the NAND outputs of the AND/NAND gates 321, 322, ... of the corresponding channels 301, 302, ... and with the second clock pulses 204 (FIG. 17), and flip-flops 341, 342, ... of a second set supplied with the outputs of the preceding flip-flops 331, 332, ..., respectively, and with the third clock pulses 205 (FIG. 17). The rearrange circuit 220 thus produces the time-rearranged PCM pulses 221–226 which are put in order by the repeated readout operation carried out at the flip-flops 331, 332, ..., 341, 342, ... by the second and the third clock pulses 204 and 205.

Figures 18, 19, 20, 21:
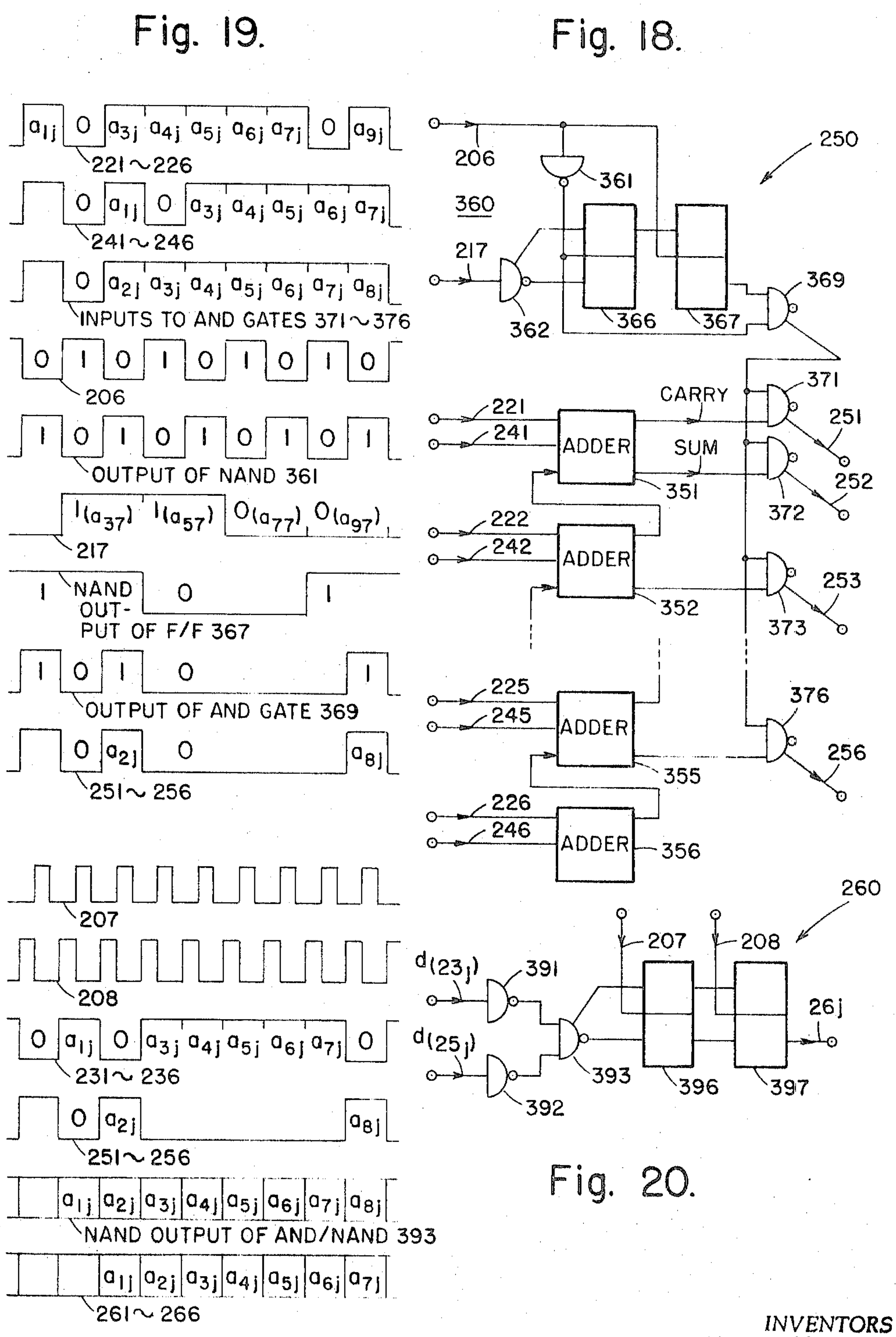
FIG. 18 is a circuit diagram of an adder circuit in the receiver.
FIG. 19 shows portions of various signals for explaining the operation of the adder circuit.
FIG. 20 is a circuit diagram of a combining circuit in the receiver.
FIG. 21 shows portions of various signals for explaining the operation of the combining circuit.

Referring to FIGS. 18 and 19, the mean value deriver 250 comprises six full adders 351-356 for carrying out the digital addition of the time rearranged and the second delayed PCM pulses 221–226 and 241–246. More particularly, the sixth adder 356 for the least significant digit receives the sixth-bit time-rearranged and second delayed PCM pulses 226 and 246 to produce "1" or "0" carry pulses. The fifth adder 355 receives the fifth-digit pulses 225 and 245 and the carry pulses of the sixth adder 356 to produce similar carry pulses and "1" or "0" sum pulses. Likewise, each of the remaining adders 351–354 produces the carry pulses and the sum pulses of the corresponding digit. The corresponding pulses of the carry pulses delivered from the first adder 351 and the sum pulses delivered from the first through the fifth adders 351–355 are the result of the addition of a set time-rearranged PCM pulses $a_{(t+1)1}, a_{(t+1)2}, \ldots$ and a corresponding set of the second delayed PCM pulses $a_{(t-1)1}, a_{(t-1)2}, \ldots$, the decimal point of the result being shifted by one bit towards the most significant digit. Thus, these outputs of the adders 351–355, if properly timed, represent the mean value of the consecutive two sets of the time rearranged PCM pulses 221–226 (FIG. 19).

The mean value deriver 250 further comprises a timing circuit 360. The timing circuit 360 in turn comprises a NAND gate 361 supplied with the fourth clock pulses 206 (FIG. 19), an AND/NAND gate 362 supplied with the seventh-bit pulses 217 (reproduced in FIG. 19) of the band-compressed PCM pulses 211-217, a first flip-flop 366 supplied with the AND and the NAND outputs of the AND/NAND gate 362 and stepped by the output (FIG. 19) of the NAND gate 361, a second flip-flop 367 supplied with the AND and the NAND outputs of the first flip-flop 366 and stepped by the fourth clock pulses 206, and a timing output AND gate 369 supplied with the output of the NAND gate 361 and the NAND output (FIG. 19) of the second flip-flop 367.

The mean value deriver 250 still further comprises a first through a sixth output AND gate 371, 372, ..., all supplied with the output (FIG. 19) of the timing output AND gate 369. The output AND gates 371, 372, ... are further supplied with the corresponding digits of the mean value of the consecutive two sets of the time rearranged PCM pulses 221-226 from the respective adders 351–355 and suppress the finite output where unnecessary.

Referring to FIGS. 20 and 21, the signal combiner 260 comprises a first through a sixth channel. The *j*th channel shown in FIG. 20 comprises a first and a second NAND gate 391 and 392 supplied with the *j*th digits of the first delayed and the mean PCM pulses 231–236 (FIG. 21) and 251–256 (reproduced in FIG. 21), respectively, an AND/NAND gate 393 supplied with the outputs of the NAND gates 391 and 392, a first flip-flop 396 supplied with the AND and the NAND outputs of the AND/NAND gate 393 and stepped by the fifth clock pulses 207 (FIG. 21), and a second flip-flop 397 supplied with the AND and the NAND outputs of the first flip-flop 396 and stepped by the sixth clock pulses 208 (FIG. 21). The NAND output $a_{NAND}$ (FIG. 21) of the AND/NAND gate 393 is given by the following logic relation:

$$\underline{a}_{NAND} = \overline{\overline{\underline{d}_{(23j)}} \wedge \overline{\underline{d}_{(25j)}}} = \underline{d}_{(23j)} \vee \underline{d}_{(25j)}$$

where $d_{(23j)}$ and $d_{(25j)}$ represent the *j*th digits of the PCM pulses 231–236 and 251–256, respectively. This relation shows that the mean PCM pulses 251–256 are superposed on the first delayed PCM pulses 231–236.

It should be mentioned here that the utilization circuit 270 may comprise a decoder for decoding the reproduced PCM pulses 2611 266 and further a low-pass filter of the same cutoff frequency as the low-pass filter on the transmitter side, for obtaining the functional frequency component of the decoded analogue signal.

Referring finally to FIGS. 22 and 23A–D another receiver for use together with the transmitter of this invention comprises an input terminal 200, a clock generator 201, a series-parallel converter 210, and a time rearrange circuit 220, all similar to the corresponding components explained in conjunction with the receiver of FIG. 11.

Figure 22:
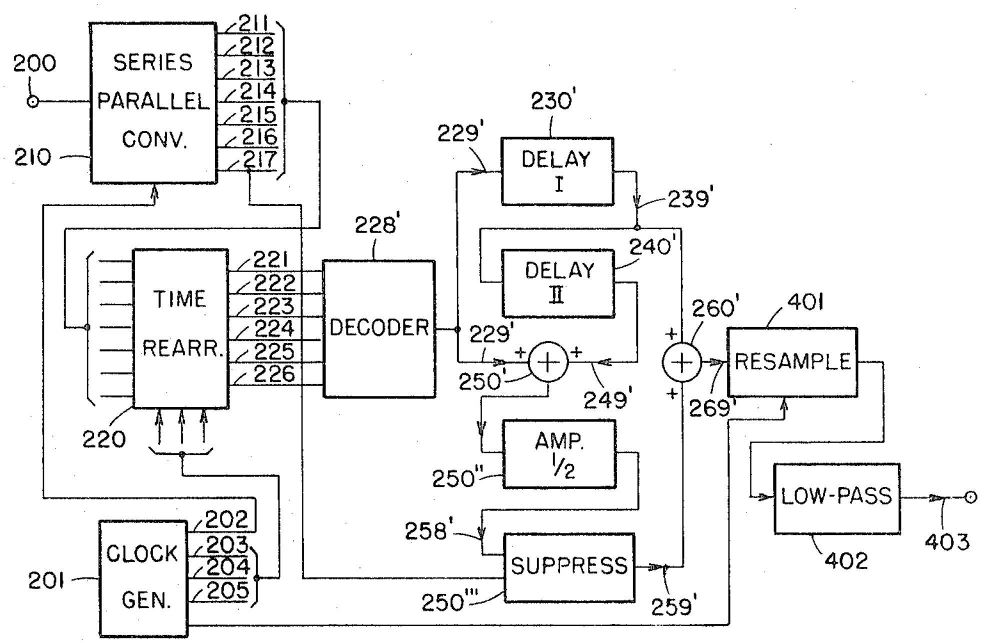
FIG. 22 is a block diagram of another receiver of the system of the invention.

The receiver of FIG. 22 further comprises a decoder 228' for decoding the time rearranged PCM pulses 221–226 to produce time rearranged samples 229' (FIG. 23A), a first delay line 230' forgiving a time delay of the sampling period *t* to the time-rearranged samples 229' to produce first delayed samples 239', a second delay line 240' also having a delay time of *t* for similarly producing second delayed samples 249', an adder 250' for adding the time rearranged samples 229' and the corresponding second delayed samples 249' to produce sum samples, a divider 250'' for dividing the sum samples by two to produce mean samples 258' (FIG. 23B), and a spurious mean sample suppressor 250''' controlled by the variation-representing seventh-digit pulses 217 for suppressing spurious mean samples contained in the mean samples to provide interpolation samples 259' (FIG. 23C) More particularly, the suppressor 250''' suppresses in this case the spurious samples $S_1'$, $S_3'$, $S_4'$, $S_5'$, $S_6'$, and $S_7'$ and produces the interpolation samples $S_2'$ and $S_8'$.

Figures 23A, 23B, 23D:
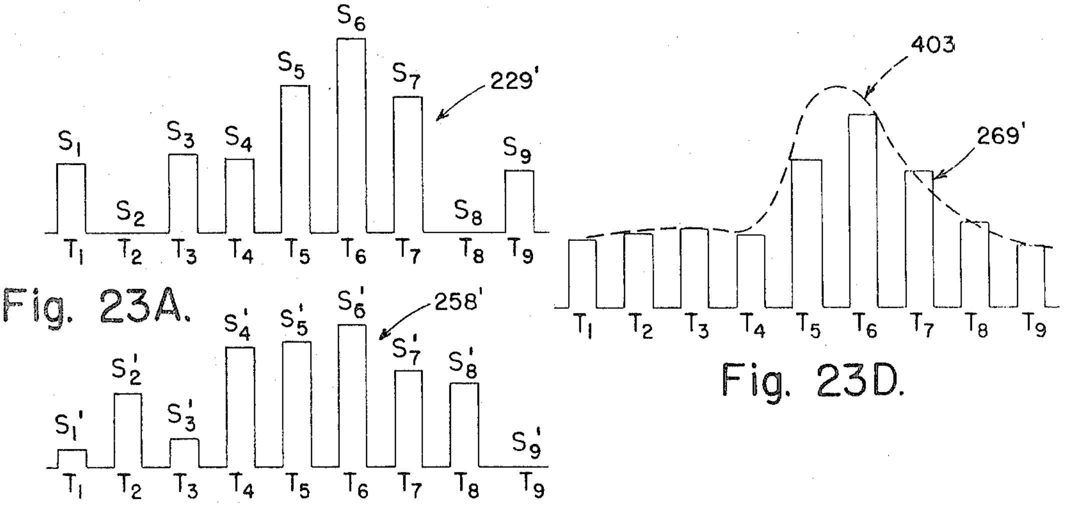
FIGS. 23A–23D show portions of various signals for explaining the operation of the receiver in FIG. 22.
Figure 23C:
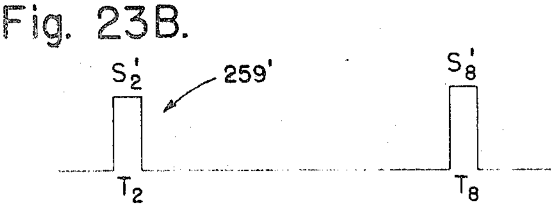

The receiver of FIG 22 still further comprises a signal combiner 260' for superposing the interpolation samples 259' on the first delayed samples 239' to produce approximately reproduced samples 269' (FIG. 23D). The receiver preferably comprises a resampling circuit 401 for resampling the approximately reproduced samples 269' with a view to eliminating the irregularities introduced into the shapes of the signal to result in noises by various time delays used during the signal processing. The receiver may comprise a low-pass filter 402 for deriving the fundamental frequency band 403 (FIG. 23D).

It will now be apparent to those skilled in the art that it is possible to adapt the parabolic interpolation explained with reference to FIGS. 6 and 7 instead of the linear interpolation illustrated throughout the description of the transmitter and the receiver. Also, it is possible to apply the invention to transmission of multiplex PCM signals. Either analogue or digital processing of the signals may be employed in conformity with the nature of the original signal, the accuracy and stability required, the simplicity of the circuit, and other factors.

It is to be noted that the value of the threshold signal *h* serves as a parameter for determining without any ambiguity the error between the original data and the approximately reproduced data for given number of bits in each original PCM codeword, number of bits in each PCM codeword to be transmitted, and manner of interpolation. It is therefore possible to determine the optimum value of the threshold signal *h* by calculating the solution of the equation for such error under a certain criterion, such as the least squares. Inasmuch as the application of this invention to the transmission of television picture signals is based on psychophysics, the criterion should then depend on the psychologic measure and consequently the optimum threshold value *h* should be determined through experiments carried out from a subjective view.

What is claimed is:

1. A transmitter for sending an analog signal varying in magnitude as a pulse code modulation signal compressed in band width, comprising:
   - a source of an analog signal varying in magnitude;
   - a generator of timing signals having different repetitive times;
   - means activated by successive clock signals occuring at a repetitive sampling time *t* for encoding one portion of said analog signal into a first preselected number of first sets, each consisting of a first preassigned number of parallel pulse code modulation pulses containing most significant digits and least significant digits and corresponding to one sample of said analog signal;
   - means for compressing said first sets in bandwidth;
   - means for transmitting said first sets as compressed in bandwidth; and
   - means for activating said compressing means to control the bandwidth compression of said first sets and simultaneously therewith to sense the speed of variation in magnitude between successive first sets and thereby between corresponding successive analog signal samples, including:
   - means activated by a second portion of said analog signal and a further timing signal occurring at a repetitive time 2$t$ for producing "1" and "0" logic signals to indicate rapid and slow rates of speed variation, respectively, in the magnitude of said analog signal at successive even number first sets and thereby at corresponding successive even number analog signal samples; and circuit means for applying to said compressing means said "1" and "0" logic signals and a predetermined number of additional timing signals of which one occurs at said sampling time $t$ and others occur at a time 2$t$ to compress said first pulse sets into a preselected number of second sets of parallel pulse code modulation pulses; said second preselected number being less than said first preselected number;

whereby each set of said second sets is provided with said more significant digits of one odd number of said first sets; certain sets of said second sets are provided with said more significant digits thereof combined with said less significant digits of corresponding odd number first sets as slow speed variations occur in the magnitude of said analog signal at even number first sets next adjacent to said respective last-mentioned odd number first sets; other sets of said second sets are provided with said more significant digits of corresponding other odd number first sets combined with said more significant digits of other even number first sets as rapid speed variations occur in the magnitude of said analog signal at other even number first sets next adjacent to said last-mentioned other odd number first sets; and final digits comprising "0" and "1" logic signals are provided in said certain and other second sets to indicate said slow and rapid variations, respectively, in said analog signal magnitude at said respective even number first sets.

2. The transmitter according to claim 1 in which said control means includes means responsive to said analog signal second portion for deriving therefrom a signal varying in magnitude and representing a varying difference in magnitude between a true value and a calculated value of said last-mentioned portion, thereby to sense said rapid and slow variations in said analog signal magnitude.

3. The transmitter according to claim 2 in which said control means includes:

a source of threshold voltage having a fixed magnitude; and means for comparing the magnitude of said derived difference voltage and said threshold voltage magnitude at successive times 2$t$ corresponding to said first-mentioned and other even number first sets to produce said "0" and "1" logic signals.

4. A transmitter for an analog signal varying in magnitude as a pulse code modulation signal compressed in bandwidth, comprising:

a source of an analog signal varying in magnitude;

a generator of timing signals having different repetitive times;

means activated by predetermined number of successive timing signals occurring at repetitive sampling times $t$ for encoding one portion of said analog signal into a preselected number of first sets, each consisting of a first preassigned number of parallel pulse code modulation pulses containing more significant digits and less significant digits and corresponding to one sample of said analog signal;

means for compressing said first sets in bandwidth;

means for transmitting said first sets as compressed in bandwidth; and means for activating said compressing means to control the bandwidth compression of said first sets and simultaneously therewith to sense the speed variation in magnitude between successive first sets and thereby between corresponding successive analog signal samples, including:

means responsive to a second portion of said analog signal for deriving therefrom a signal varying in magnitude and representing a varying difference in magnitude between a true value and a calculated value of said last-mentioned portion thereby to sense the speed variation in the magnitude of said analog signal at successive first sets and thereby at corresponding successive analog signal samples;

a source of threshold voltage of fixed magnitude;

means for comparing the magnitudes of said derived voltage and said threshold voltage at successive timing signals 2$t$ corresponding to successive even numbers of said first sets to produce two different logic signals to represent the speed variation in the magnitude at said last-mentioned even number first sets, a first of said two logic signals representing a slow speed variation magnitude and a second of said two logic signals representing a rapid speed variation magnitude, each of said one and other logic signals having a time duration 2$t$;

means for delaying said first and second logic signals to register in time with two successive first sets, each including one of said even number first sets; and circuit means for applying to said compressing means and first and second speed variation logic signals and a predetermined number of additional timing pulses of which one occurs at said sampling time $t$ and others occur at a time 2$t$ to compress said first sets into a preselected number of second sets, each consisting of a second preassigned number of parallel pulse code modulation pulses and one of said first and second logic signals; said second preselected number being less than said first preselected number;

whereby each of said second sets includes said more significant digits of one odd number of said first sets; each of said last-mentioned digits doubled in width and delayed by one sampling time $t$ relative to said respective first and second speed-variation logic signals; certain sets of said second sets are provided with said more significant digits thereof combined said less significant digits of corresponding odd number first sets as slow speed variations occur in the magnitude of said analog signal at even number first sets adjacent to said last-mentioned odd number first sets as indicated by said first logic signals; each of said last-mentioned less significant digits doubled in width and delayed by one sampling time $t$; and other sets of said second sets are provided with said more significant digits of corresponding other odd number first sets combined with said more significant digits of other even number first sets as rapid speed variations occur in the magnitude of said analog signal at other even number first sets next adjacent to said last-mentioned odd number first sets; and final digits comprising "0" and "1" logic signals corresponding to said first and second speed variation signals, respectively, are provided in said certain and other second sets to indicate said respective slow and rapid variations in said analog signal magnitude at said respective even number first sets.

5. A transmitter for sending an analog signal varying in magnitude as a pulse code modulation signal, comprising:

a source of analog signal varying in magnitude;

means for encoding a first portion of said analog signal into a preselected number of first sets of parallel pulse code modulation pulses, each set representing a corresponding sample of said analog signal and including a first preassigned number of said parallel pulses including more significant digits and less significant digits;

means activated by a second portion of said analog signal for compressing said first pulse sets into a second preselected number of second sets of parallel pulse code modulation pulses; said second preselected number being smaller than said first preselected number; each set of said second pulse sets including said more significant digits of one odd number set of said first sets; certain sets of said second pulse sets having said more significant digits thereof combined with said less significant digits of corresponding odd number first sets as slow speed variations occur in the magnitude of said analog signal at even number first sets next adjacent to said respective last-mentioned odd number first sets; other sets of said second sets having said more significant digits of corresponding other odd number first sets combined with said more significant digits of other even number first sets as rapid speed variation occurs in the magnitude of said analog signal at other even number first sets next adjacent to said last-mentioned other odd number first sets; and a final digit included in each of said certain second sets and comprising a "0" logic signal to indicate said slow variation analog signal magnitude at each of said first-mentioned even number first sets and a "1" logic signal in each of said other second sets to indicate said rapid variation analog signal magnitude at each of said other even number first sets; and means for transmitting said second sets of parallel pulse code modulation pulses 6. A receiver for a pulse code modulation signal comprised in bandwidth to represent an analog signal, comprising:

a source of output series pulse code modulation pulses compressed in bandwidth to represent an analog signal varying in magnitude and divided into a preselected number of first sets of parallel pulse code modulation pulses, each set representing a corresponding sample of said analog signal and including a first preassigned number of said parallel pulses consisting of more significant digits and less significant digits; said pulses of said first sets compressed into a preselected number of second sets of parallel pulse code modulation pulses; said preselected first set number being greater than said preselected second set number; each set of said second sets including said more significant digits of one number set of said first sets; certain sets of said second sets having said more significant digits thereof combined with said less significant digits of corresponding odd number first sets as slow speed variations occur in the magnitude of said analog signal at next adjacent even number first sets; other sets of said second sets including said more significant digits of corresponding other odd number first sets combined with said more significant digits of next adjacent other even number first sets as rapid speed variations occur in the magnitude of said analog signal at said last-mentioned sets; and final digits included in said respective second sets and comprising "0" and "1" logic signals to indicate said slow and rapid variation analog signal magnitudes, respectively, at each of said first-mentioned even number first sets; each of said digits in each of said second sets and said respective "0" and "1" signals having a time duration of $2t$, $t$ being the time of each of said analog signal samples; leading edges of said second set digits including said combined more significant and less significant digits corresponding with leading edges of associated "0" signals and leading edges of said second set digits including said combined more significant digits corresponding with leading edges of associated "1" signals; said second set parallel pulse digits present at said source output as corresponding series pulse code modulation pulses;

means for generating a first timing pulse recurring at a time $4t$, a second timing pulse recurring at a time $2t$, and third and fourth timing pulses, each recurring at a time $t$;

means activated by said first timing pulses for converting said source output preselected second set series pulse code modulation pulses into a preselected number of third sets of pulse code modulation pulses of combined parallel more significant digits, less significant digits, and "0" and "1" logic signals corresponding to said combined more significant digits, less significant digits, and said "0" and "1" signals, respectively, of said preselected second pulse sets;

means responsive to said second, third and fourth timing pulses for rearranging said third pulse sets to provide a preselected number of fourth sets of parallel pulse code modulation pulses; said preselected fourth number being greater than said preselected first number; certain sets of said fourth sets provided with combined parallel more significant digits and less significant digits corresponding to said odd number first pulse sets consisting of more significant digits and less significant digits during first halves of said respective second timing pulses $2t$ and followed by sets of parallel "0" logic signals during the second halves of said last-mentioned pulses when said final pulses in said respective third pulse sets are "0" logic signals; and other sets of said fourth pulse sets provided with more significant digits corresponding to said more significant digits of other odd number first pulse sets during first halves of said respective second timing pulses $2t$ and followed by more significant digits corresponding to said more significant digits of said other next adjacent even number first pulse sets during second halves of said last-mentioned pulses when said final pulses in said respective other third sets are logic "1" signals; said parallel more significant digits in said respective other fourth sets followed by parallel sequential sets of "1," "0" and "1" logic signals; and means for utilizing said fourth pulse sets to reproduce said analog signal varying in magnitude.

7. The receiver according to claim 6 in which said utilizing means includes:

means for delaying a first portion of said fourth pulse sets by a first 1-digit time interval; and means for delaying a first portion of said 1-digit delayed first portion of said fourth pulse sets by a second 1-digit time interval.

8. The receiver according to claim 7 in which:

said timing means generates a fifth timing pulse recurring at a time $2t$; and said utilizing means comprises means responsive to said "0" and "1" signals included in said third pulse sets and to said fifth timing pulse for digitally adding a second portion of said fourth pulse sets and said first portion of said fourth pulse sets delayed by said first and second 1-digit time intervals and thereafter dividing such digital sum by two to produce a fifth preselected number of means sets of parallel pulse modulation pulses, said first and fifth preselected numbers being identical; said fifth pulse sets comprising sets of "0" logic signals corresponding to said certain and other sets included in said fourth pulse sets and further sets of combined more significant and less significant digits corresponding to sets of parallel "0" signals included in said fourth pulse sets.

9. The receiver according to claim 8 in which:

said timing means generates sixth and seventh timing pulses, each recurring at a time $t$;

said utilizing means comprises means responsive to said sixth and seventh timing pulses for superposing said fifth pulse sets on a second portion of said 1-digit delayed first portion of said fourth pulse sets to produce a sixth preselected number of sets parallel pulse code modulation pulses; said first and sixth preselected numbers being identical; certain sets of said sixth pulse sets comprising combined more significant digits and less significant digits corresponding to said combined more significant digits and less significant digits included in said certain fourth pulse sets, first additional sets of combined more significant digits and less significant digits corresponding to said combined more significant digits and less significant digits included in said fifth pulse sets, and second additional sets of combined more significant digits and sequential "1," "0" and "0" logic signals corresponding to said respective other fourth pulse sets including combined more significant digits and sequential "1," "0" and "0" logic signals.

10. The receiver according to claim 9 in which said utilizing means includes a utilizing circuit for translating said sixth pulse sets into a reproduction of said analog signal varying in magnitude.

11. The receiver according of claim 6 in which said utilizing means includes:

means for decoding said rearranged fourth pulse sets to provide time rearranged fifth pulse sets corresponding to said certain and other sets of said fourth sets and to omit pulses corresponding to said "0" sets in said fourth sets; and means for translating said fifth pulse sets to reproduce said analog signal varying in magnitude.

12. The receiver according to claim 11 in which said translating means includes:

means for delaying a first portion of said fifth pulse set by a first 1-digit time interval;

means for delaying a second portion of said 1-digit delayed first portion of said fifth pulse sets;

means for adding said first and second 1-digit delayed first portion of said fifth pulse sets and a second portion of said fifth pulse sets to produce sum samples thereof;

means for dividing said sum samples to produce mean pulse samples;

means responsive to said "0" and "1" signals included in said third pulse sets for converting said mean pulse samples into interpolation pulse samples to represent said omitted pulses in said fifth pulse sets;

means for combining a second portion of said 1-digit delayed first portion of said fifth pulse sets and said interpolation pulse samples to produce a sixth set of pulses whose envelope represents the envelope of said analog signal; and means for utilizing said sixth pulse set to reproduce said analog signal.

13. A system for transmitting and receiving an analog signal varying in magnitude as a pulse code modulation signal compressed in bandwidth, comprising:

a transmitter consisting of:

a source of an analog signal varying in magnitude;

means for encoding a first portion of said analog signal into a preselected number of first sets of parallel pulse code modulation pulses, each set representing a corresponding sample of said analog signal and including a first preassigned number of said parallel pulses including more significant digits and less significant digits;

means activated by a second portion of said analog signal for compressing said first pulse sets into a preselected number of second sets of parallel pulse code modulation pulses; said preselected second number being smaller than said preselected first number; each set of said second pulse sets including said more significant digits of one odd number set of said first sets; certain sets of said second pulse sets having said more significant digits thereof combined with said less significant digits of corresponding odd number first sets as slow speed variations occur in the magnitude of said analog signal at even number sets next adjacent to said respective last-mentioned odd number first sets; other sets of said second sets having said more significant digits of corresponding other odd number first sets combined with said more significant digits of other even number first sets as rapid speed variations occur in the magnitude of said analog signal at said last-mentioned sets; and final digits included in said certain second sets and comprising "0" logic signals to indicate said slow variation analog signal magnitude at said respective first-mentioned even number first sets and "1" logic signals to indicate said rapid variation analog signal magnitude at said respective other even number first sets; each of said digits in each of said second sets and each of said "0" and "1" signals having a time duration $2t$, $t$ being the time duration of each of said analog signal samples; leading edges of said digits of said certain second sets corresponding with leading edge of associated "0" signals and leading edges of said digits of said other second sets corresponding with leading edges of associated "1" signals; and means for transmitting said second pulse sets as series pulse code modulation pulses; and a receiver consisting of:

means for receiving said transmitted series pulse code modulation pulses and converting said last-mentioned pulses into a preselected number of third sets of pulse code modulation pulses; said preselected third number and said preselected second number being identical; each of said third sets including combined parallel more significant digits, less significant digits, and "0" and "1" logic signals corresponding to said combined more significant digits, less significant digits and "0" and "1" logic signals included in each of said second sets; and means activated by said third pulse sets for providing a reproduction of said analog signal varying in amplitude.

14. A system for transmitting and receiving an analog signal varying in magnitude as pulse code modulation signal compressed in bandwidth, comprising:

a transmitter consisting of:

a source of analog signal varying in magnitude;

means for encoding a first portion of said analog signal into a preselected number of first sets of parallel pulse code modulation pulses, each set representing a corresponding sample of said analog signal and including a first preassigned number of said parallel pulses including more significant digits and less significant digits;

means activated by a second portion of said analog signal for compressing said first pulse sets into a preselected number of second sets of parallel pulse code modulation pulses; said preselected second number being smaller than said preselected first number; each set of said second pulse sets including said more significant digits of one odd number set of said first sets; certain sets of said second sets having said more significant digits thereof combined with said less significant digits of corresponding odd number first sets as slow speed variations occur in the magnitude of said analog signal at even number sets next adjacent to said respective last-mentioned odd number first sets; other sets of said second sets having said more significant digits of corresponding other odd number first sets combined with more significant digits of other even number first sets as rapid speed variations occur in the magnitude of said analog signal at said last-mentioned sets; and final digits included in said certain second sets and comprising "0" logic signals to indicate said slow variation analog signal magnitude at said first-mentioned even number first sets and "1" logic signals to indicate said rapid variation analog signal magnitude at said respective other even number first sets; each of said digits in each of said second sets and each of said "0" and "1" signals having a time duration $2t$, $t$, being the time duration of each of said analog samples; leading edges of said digits of said certain second samples corresponding with leading edges of associated "0" signals and leading edges of said digits of said other second sets corresponding with leading edges of associated "1" signals;

means for transmitting said second pulse sets as series pulse code modulation pulses; and a receiver consisting of:

means for receiving said transmitted series pulse code modulation pulses and converting said last-mentioned pulses into a preselected number of third sets pulse code modulation pulses corresponding to said preselected number of second sets of pulse code modulation pulses;

means for rearranging said third pulse sets to provide a preselected number of fourth pulse sets of parallel pulse code modulation pulses; said preselected fourth number being greater than said preselected third number; certain sets of said fourth sets provided with more significant and less significant digits corresponding to said odd number first sets consisting of more significant digits and less significant digits and followed by sets of parallel "0" logic signals when said final pulses in said third pulse sets are "0" logic signals; and other sets of said fourth sets provided with more significant digits corresponding to more significant of other odd number first sets followed by more significant digits corresponding to said more significant digits of said other next adjacent even number first sets where said final pulses in said respective other third sets are "1" logic signals; said more significant digits in said respective other fourth sets followed by parallel sequential sets of "1," "0" and "0" logic signals;

means for decoding said rearranged fourth pulse sets to provide time rearranged fifth pulse sets corresponding to said certain and other sets of said fourth sets and to omit pulses corresponding to said "0" sets in said fourth pulse sets;

means for converting said fifth pulse sets into a sixth set of pulses whose envelope represents the envelope of said transmitter analog signal; and means for utilizing said sixth pulse set to reproduce said transmitter analog signal.

* * * * *